Aug. 10, 1965 C. E. ATKINS ETAL 3,200,306
TOUCH RESPONSIVE CIRCUIT
Filed Sept. 12, 1963
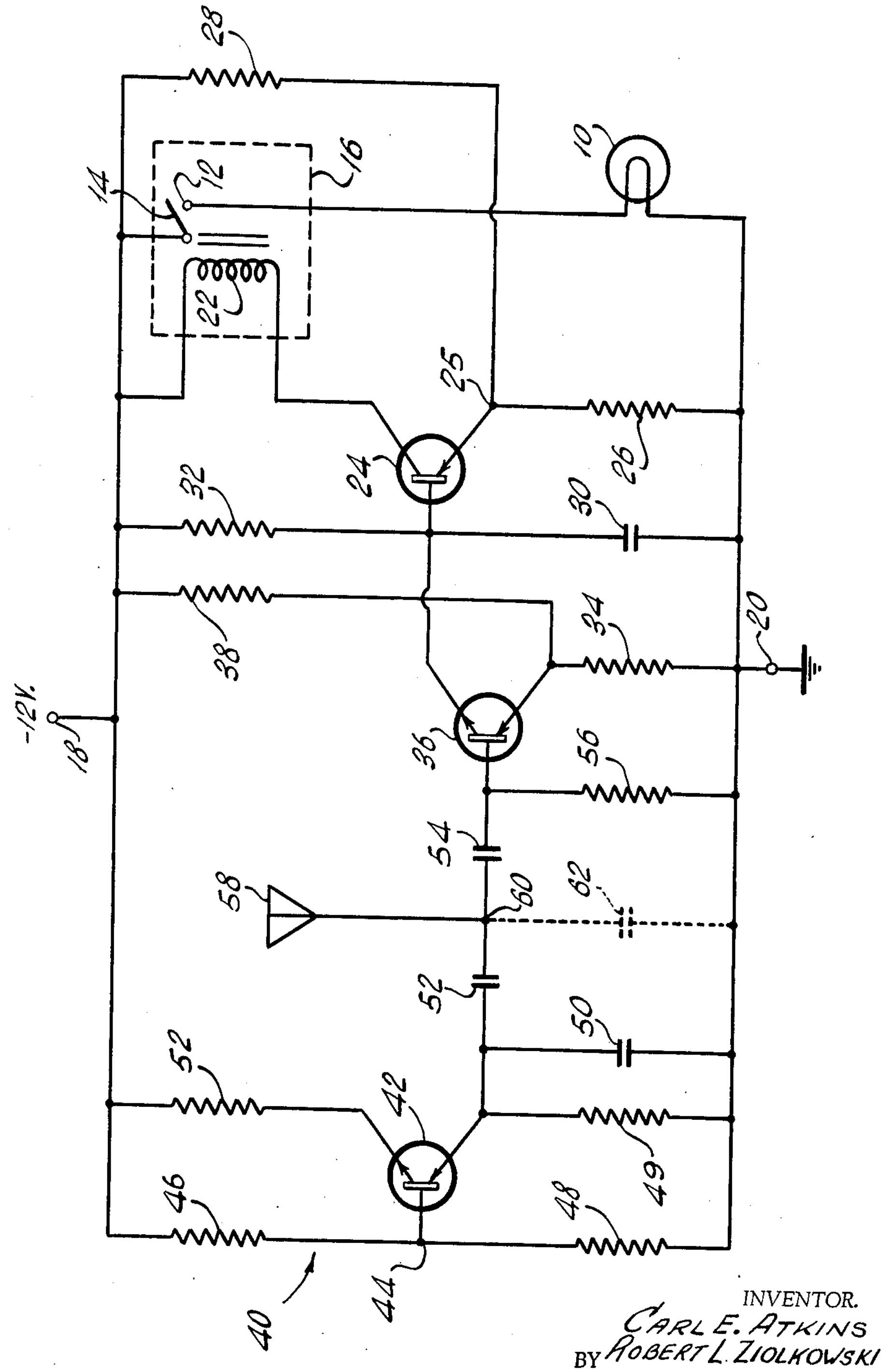
INVENTOR.
CARL E. ATKINS
BY ROBERT L. ZIOLKOWSKI
Eyre, Mann & Lucas
ATTORNEYS United States Patent Office 3,200,306

Patented Aug. 10, 1965

3,200,306

TOUCH RESPONSIVE CIRCUIT

Carl E. Atkins, Great Notch, and Robert L. Ziolkowski, South Plainfield, N.J., assignors to Tung-Sol Electric Inc., a corporation of Delaware Filed Sept. 12, 1963, Ser. No. 308,505
6 Claims. (Cl. 317—146)

The present invention relates to touch responsive circuits and provides a touch responsive circuit which changes the level of the charge on a capacitor in response to the body capacity of a person contacting a touch responsive element and uses the change in the level of the charge to either energize or deenergize a relay.

Briefly, the capacitor is connected in a charging circuit including a resistor and a source of D.C. potential such as a 12 volt car battery, connected in series with the capacitor and also in a discharging circuit including a resistor and a semiconductor switching device, such as a TS1595, connected in shunt with the capacitor. Normally the semiconductor switching device is kept conductive by pulses supplied to its gating terminal allowing current to flow through the discharge path to keep the charge on the capacitor from exceeding a predetermined level. However, when a touch responsive element is touched, the pulses to the gating terminal are suppressed, rendering the semiconductive switching device non-conductive, to cut off the discharge path for the capacitor and thereby permit the charge on the capacitor to increase.

The coil of the relay is connected in series with the source of D.C. potential and a tranisistor biased to detect the change in the potential across the capacitor caused by the increase in the charge on the capacitor to make the energization and deenergization of the relay responsive to the touch of the touch responsive element.

This circuit may be used to make the operation of the devices responsive to touch. For instance, since this circuit will operate off a 12 volt battery, the contacts of the relay could be incorporated into circuit controlling excitation to a prime mover for opening the back door of a bus and the back door of the bus could be made the touch responsive element for the circuit so that when the door is touched it will automatically open.

For a better understanding of the invention reference should be made to the accompanying electrical schematic of one embodiment thereof.

In the illustrated embodiment, a load 10, indicated diagrammatically as a light bulb, is connected in series with a normally open contact 12 and the armature 14 of a relay 16 between the terminals 18 and 20 of the source of D.C. potential to make current flow through the load 10 depend on whether or not the relay is energized.

The coil 22 of the relay is connected between the negative terminal 18 of the source of D.C. potential and the collector of a transistor 24 whose emitter is connected at a point 25 common to two resistors 26 and 28 connected in series between the two terminals 18 and 20 of the source of D.C. potential to bias the emitter negative with respect to ground or the more positive terminal 20 of the source of D.C. potential. Therefore, if the potential between the base and ground is more negative than the bias on the emitter, the transistor 24 will conduct permitting current to flow through the coil 22 to energize the relay 16, and if the potential between the base and ground is less negative than the bias on the emitter, the transistor will be cut off preventing current from flowing through the coil 22 to energize the relay 16. This means that current flow through the load 10 may be controlled by changing the level of the potential between the base and the positive terminal 20.

In accordance with the present invention, the potential between the base and the positive terminal 20 can be selectively varied by making the charge on a capacitor responsive to the body capacity of an individual touching a touch responsive element. The capacitor 30 is connected between the base of the transistor 24 and the positive terminal 20 of the source of D.C. potential. The capacitor is charged through a resistor 32 connecting the base of the semi-conductor 24 to the negative terminal 18 of the source of D.C. potential and is discharged through a controllable discharge path including a resistor 34 and a PNPN semi-conductor switching device 36, such as a TS1595, which are connected in series across the capacitor between the base of the transistor 24 and the positive terminal 20 of the source of D.C. potential.

The collector of semi-conductor switching device 36, the outer N, is connected to the base of the transistor 24 and the emitter, the outer P, is connected to one end of the resistor 34. The other end of the resistor 34 is connected to the terminal 20 to complete the discharge circuit. Another resistor 38 is connected between the negative terminal 18 of the source of D.C. excitation and the emitter of the switching device to bias the emitter negatively with respect to ground or the positive terminal 20 of the source of D.C. excitation.

To start with there is no charge in the capacitor 30 and therefore the collector of the semi-conductor switching device 36 is positive with respect to the emitter. However, when the capacitor charges sufficiently, through resistor 32, it will make the collector more negative than the emitter. When this occurs the switching device 36 may be rendered conductive, to discharge the negative potential on the capacitor, by making the gate, the inner N zone, of the semi-conductor switching device negative with respect to the emitter. When this is done the capacitor discharges towards zero until the current flow through the semi-conductor switching device 36 is insufficient to sustain conduction through the semi-conductor switching device therefore cutting off the discharge path.

An oscillator 40 is provided to supply negative pulses to the base of the semi-conductor switching device to trigger it into conduction as discussed above. This oscillator includes a second PNPN semi-conductor switching device 42. The base of this second semi-conductor switching device is connected to the common point 44 of two resistors 46 and 48 connected in series between the negative and positive terminals 18 and 20 of the source of D.C. potential. The emitter of the second semi-conductor switching device 42 is connected to the positive terminal 20 of the source of D.C. potential by a resistor 49 and a capacitor 50 in parallel, and the collector of the second semi-conductor switching device 42 is connected to the negative terminal of the source of D.C. potential by resistor 52.

The two resistors 46 and 48 bias the base of the semiconductor switching device negative with respect to the emitter thereby allowing current to flow through resistor 52 and the semiconductor switching device to charge capacitor 50. The charging of the capacitor 50 continues until the voltage on the potential across the capacitor cuts off the semiconductor switching device by reducing the current flow through the semiconductor switching device below the sustaining level and also by making the voltage on the emitter more negative than that of the base. This ends charging, permitting the capacitor 50 to discharge towards zero through resistor 49. Discharging continues until after the base is again more negative than the emitter. When this occurs, the semiconductor is triggered conductive, allowing current to flow through the semiconductor switching device to charge the capacitor to a more negative potential once again. This alternate charging and discharging of the capacitor 50 provides a series of a saw tooth shaped negative voltage waves across the capacitor 50.

The capacitor is connected to the base of the first semiconductor switching device 36 by two capacitors 52 and 54 connected in series, and a resistor 56 is connected between the base of the semiconductor switching device 36 and the positive terminal 20 of the source of D.C. potential. The capacitors 52 and 54 in combination with the resistor 56 differentiate the saw tooth shaped waves to produce pulses at the base of the semiconductor switching device 36 which are used to trigger the semiconductor switching device 36 into conduction.

The repetition rate of these pulses is slow enough to permit the capacitor 30 to discharge sufficiently to cut off the semiconductor device 36 as described above after each pulse and before the next pulse arises. This means that the capacitor 30 will charge until a negative pulse is applied to the base of the semiconductor switching device 36 whereupon the switching device is rendered conductive and the capacitor 30 starts discharging. Discharging of the capacitor 30 continues until the current through the switching device 36 falls below the sustaining level cutting off the switching device. The capacitor will then charge until the next pulse is applied to the base of the switching device to again render the switching device conductive so that it again discharges the capacitor 30. This alternate charging and discharging of capacitor 30 keeps the potential across the capacitor from reaching its maximum magnitude thereby preventing the base of the transistor 24 from being more negative than the emitter of the transistor which of course keeps the relay deenergized.

To permit energization of the relay, a touch responsive element 58 is connected to a point 60 common to the two capacitors 52 and 54. When this touch responsive element is touched it inserts the body of the individual touching it into the circuit between point 60 and ground so that capacitor 52 and the body capacity 62 act as a voltage divider which cuts down the magnitude of the pulses supplied to the semiconductor switching device 36 sufficiently to prevent them from triggering the switching device into conduction. Therefore, the semiconductor remains non-conductive keeping the discharge path for capacitor 30 open and thereby allowing the capacitor to charge to its full potential. This makes the base of the transistor 24 more negative than the emitter so that the transistor becomes conductive and allows current to flow through the coil 22 of the relay to energize the relay 16. With the relay energized the armature 14 is positioned against the normally open contact 12 to complete the circuit through the load 10. The circuit through load 10 will remain closed as long as the touch responsive element 58 is touched. However, once touch is removed from the touch responsive element 58 the body capacitor 62 will be removed from the circuit allowing the full magnitude of the pulses from the oscillator 40 to be applied to the base of semiconductor switching device 36, so that the semiconductor switching device is periodically rendered conductive to prevent energization of the relay 16.

Obviously changes can be made to the illustrated embodiment within the scope of the present invention and therefore this application is intended to cover all changes and modification of the described circuit chosen for the purpore of illustrating this invention which does not constitute a departure from the spirit and scope of the invention.

What is claimed is:

1. A touch responsive circuit which operates on a source of D.C. potential comprising:

(a) a capacitor;

(b) a charging circuit coupling said capacitor to the source of D.C. potential for charging said capacitor to a first level of D.C. potential;

(c) a semiconductor switching device coupled across the capacitor to discharge said capacitor to a second level of D.C. potential when said semiconductor switching device is conductive;

(d) an oscillator coupled to said semiconductor switching device to provide pulses to render said semiconductor switching device conductive;

(e) touch responsive means coupled to said oscillator to suppress the magnitude of the pulses supplied to the oscillator when the touch responsive means is touched to render the semiconductor switching device non-conductive; and (f) circuit controlling means responsive to the level of potential across said capacitor.

2. The touch responsive circuit of claim 1 wherein said circuit controlling means is a relay and a three terminal semiconductor device having the coil of the relay and two terminals of the semiconductor device connected in series with the source of D.C. potential and having one of the said two terminals and the third terminal of the semiconductor switching device connected in series with the capacitor so that said relay is energized when the potential of the capacitor is charged to the first level of D.C. potential and deenergized when the capacitor is charged to the second level of D.C. potential.

3. The touch responsive circuit of claim 1 wherein the semiconductor switching means comprises a four layer semiconductor biased to stop conducting between pulses from said oscillator.

4. A touch responsive circuit which operates on a source of D.C. potential comprising:

(a) a capacitor connected at one end to the positive terminal of the source of D.C. potential;

(b) a resistor connected in series between the other end of the capacitor and the negative terminal of the source of D.C. potential to provide a charging path for the capacitor to charge said capacitor to a first level of D.C. potential;

(c) two resistors connected in series across the source of D.C. potential;

(d) a PNPN semiconductor switching device with the outer N, the collector for the semiconductor switching device, connected to point which is common to the capacitor and the resistor providing a charging path for the capacitor and with the outer P, the emitter for the semiconductor switching device, connected to a point common to the two resistors connected in series so that when said semiconductor switching device is conductive it provides a path for discharging said capacitor to a second level of potential;

(e) an oscillator coupled to said semiconductor switching device to provide pulses between the inner N zone, the gate of the semiconductor switching device, and the emitter of the semiconductor switching device to render the semiconductor switching device conductive; and (f) touch responsive means coupled to said oscillator to suppress the magnitude of the pulses supplied by the oscillator when the touch responsive means is touched and to render the semiconductor switching device non-conductive; and (g) circuit controlling means responsive to the level of potential across said capacitor.

5. The touch responsive circuit of claim 4 wherein said circuit controlling means is a relay and a three terminal semiconductor device with the coil of the relay and two terminals of the semiconductive device connected in series with the source of D.C. potential and one of said two terminals and the third terminal of the semiconductor switching device connected in series with the capacitor so that said relay is energized when the potential of the capacitor is at the first level and deenergized when the capacitor is at the second level.

6. The touch responsive circuit of claim 4 wherein the charge on the capacitor renders the semiconductor switching device non-conductive between pulses of said oscillator.

References Cited by the Examiner

UNITED STATES PATENTS

| | | | |
|---|---|---|---|
| 2,743,433 | 4/56 | Parmet | 340—258 |
| 2,992,420 | 7/61 | Riker. | |
| 3,109,893 | 11/63 | Burns. | |
| 3,111,608 | 11/63 | Boenning et al. | 317—148.5 X |

SAMUEL BERNSTEIN, *Primary Examiner.*